United States Patent
Lautenschlaeger et al.

(10) Patent No.: US 8,607,591 B2
(45) Date of Patent: Dec. 17, 2013

(54) DEVICE AND METHOD FOR MANUFACTURING GLASS WITHOUT FORMING BUBBLES ON PRECIOUS METAL COMPONENTS

(75) Inventors: Gerhard Lautenschlaeger, Jena (DE); Thomas Pfeiffer, Ingelheim (DE); Andreas Roters, Mainz (DE); Gernot Roeth, Dalheim (DE)

(73) Assignee: Schott AG, Mainz (DE)

( * ) Notice: Subject to any disclaimer, the term of this patent is extended or adjusted under 35 U.S.C. 154(b) by 539 days.

(21) Appl. No.: 12/548,578

(22) Filed: Aug. 27, 2009

(65) Prior Publication Data

US 2010/0018251 A1    Jan. 28, 2010

Related U.S. Application Data

(62) Division of application No. 11/091,599, filed on Mar. 28, 2005, now Pat. No. 7,628,037.

(30) Foreign Application Priority Data

Mar. 30, 2004    (DE) .......................... 10 2004 015 577

(51) Int. Cl.
*C03B 5/43*    (2006.01)

(52) U.S. Cl.
USPC ............... 65/157; 65/160; 65/178; 65/374.12

(58) Field of Classification Search
USPC .................................... 65/157, 160, 374.12, 1
See application file for complete search history.

(56) References Cited

U.S. PATENT DOCUMENTS 5,580,439 A * 12/1996 Baucke et al. ................ 205/782
5,785,726 A *  7/1998 Dorfeld et al. ............... 65/134.1

* cited by examiner

*Primary Examiner* — John Hoffmann
(74) *Attorney, Agent, or Firm* — Michael J. Striker

(57) ABSTRACT

The device for manufacturing glass, in which bubble formation on precious metal components is prevented, has a precious or refractory metal wall (12, 43) at least partially surrounding a glass melt from which the glass is made, a first electrode pair (20, 21) for measuring oxygen partial pressure at an interface between the glass melt and the wall to obtain an actual value, a second electrode pair (12, 43, 20) for measuring an oxygen partial pressure in the glass melt to obtain a set point value and a regulating system (39, 45) for adjusting the oxygen partial pressure at the interface according to a comparison between the actual value and the set point value, so that the oxygen partial pressure at the interface is within a safe range.

10 Claims, 4 Drawing Sheets

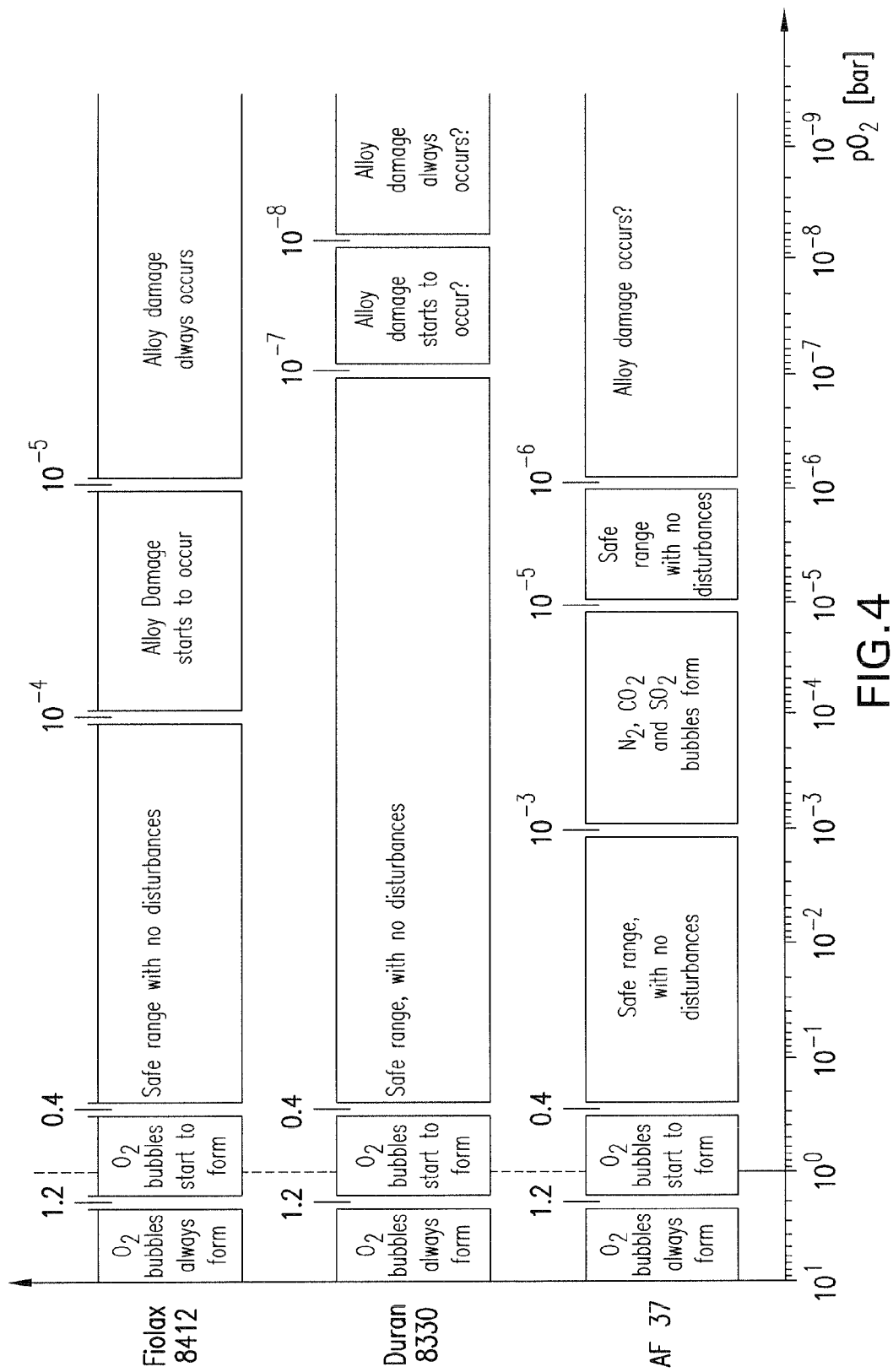

DEVICE AND METHOD FOR MANUFACTURING GLASS WITHOUT FORMING BUBBLES ON PRECIOUS METAL COMPONENTS

CROSS-REFERENCE

This is a divisional of U.S. patent application Ser. No. 11/091,599, which was filed on Mar. 28, 2005 now U.S. Pat. No. 7,628,037. The device that is described and claimed herein below is also described in the aforesaid US Patent Application, which provides the basis for a claim of priority of invention under 35 U.S.C. 120.

BACKGROUND OF THE INVENTION

1. The Field of the Invention

The present invention relates to a method for manufacturing glass, with which molten glass is enclosed at least partially by precious metal walls and/or refractory metal walls, and with which the oxygen partial pressure of the molten glass is influenced by a treatment means to prevent disturbances, a device for this purpose, and the use of the glass obtained as a result.

2. The Related Art

In this context, the term "precious metal" includes platinum, gold, rhenium, all other metals in the platinum group, and the alloys of the aforementioned metals, and the stated metals and alloys in oxide dispersion-strengthened form. Molybdenum is used in particular as the refractory metal, as are tungsten, niobium and tantalum.

It is known that, at high temperatures such as those that occur in a glass melt, for example, a small portion of the water that is present breaks down into hydrogen and oxygen. When the glass melt comes in contact with components made of precious metals, in particular platinum and its alloys, the hydrogen that is formed can pass through the platinum part. As a result, the oxygen in the melt is enriched and oxygen bubbles form that—provided no further action is carried out—remain in the finished glass product and lower its quality in a critical manner. Particularly problematic in this regard is the fact that precious metal components are used primarily directly after the refining area, making it very difficult to remove the oxygen bubbles that form on the precious metal components from the glass melt.

Publication EP 1 101 740 A1 therefore proposes that bubbles be prevented from forming by applying a reverse voltage via electrochemical means. A variant is proposed, among others, with which the one molybdenum electrode is located in the glass melt upstream of the precious metal components, the electrode being connected in a conductive manner with the precious metal components. An adequate reverse voltage is generated as a result without an external power supply. A method is described in publication U.S. Pat. No. 5,785,726, with which oxygen bubbles are prevented from forming in the glass melt by preventing hydrogen from the glass melt from escaping through the precious metal walls by establishing an atmosphere on the side of the precious metal walls facing away from the glass melt that contains a high percentage of water vapor. The purpose of this is to prevent hydrogen gas from the glass melt from diffusing to the outside through the precious metal walls made permeable by the high temperatures. With the two known methods, oxygen bubbles can indeed be largely prevented from forming in the glass melt on precious metal components, but, as a result, the oxygen partial pressure is held at the level that existed before the melt flowed into the platinum system.

It has been shown that bubbles still form with the known procedures described above, however, and defective glasses are produced as a result.

SUMMARY OF THE INVENTION

It is an object of the present invention to provide a method and a device for producing glass, in which formation of bubbles on precious metal components—and other disturbances—are reliably prevented.

This object and others, which will be made apparent hereinafter, are attained, in a method of producing glass of the type initially described, i.e. by determining the particular oxygen partial pressure on a precious metal part using a voltage between the precious metal part and a reference electrode located in the melt and calculating it from the voltage. The precious metal part, in particular the walls of the tank and/or the pipe, is preferably subdivided into segments that are electrically insulated from each other. Insulation of this type is composed, for example, of parts of fire-resistant material such as mullite, sillimanite, quartzal and/or corundum. This makes it possible to regulate the oxygen partial pressure in the safe range in an individualized manner for each individual insulated precious metal part via separate regulation of the treatment means.

According to the present invention, it was discovered that, with the known method described above for suppressing the formation of oxygen bubbles, the oxygen partial pressure in the melt in the region of contact with the precious metal components is reduced to the extent that at least partially reducing conditions exist. It has been shown according to the present invention that, surprisingly, at an oxygen partial pressure that is too low, $N_2$, $CO_2$ and $SO_2$ bubbles start to form and/or alloy damage occurs. The present invention is therefore based on the finding that extreme reducing conditions must be prevented to ensure good glass quality. According to the present invention, these extreme reducing conditions are prevented by adjusting and/or regulating the oxygen partial pressure that exists at the interface of the glass melt and the precious metal part in particular within a safe range. This can take place at the interface itself, for example, or by using an electrode located in the melt. The electrode is preferably located in the region close to the interface. The oxygen partial pressure can be raised or lowered by applying a reverse voltage with the appropriate polarity. In addition, the oxygen content can be lowered by using a reducing hydrogen or water vapor atmosphere, and it can be increased by rinsing with oxygen in pure or diluted form.

This safe range can be determined for the particular glass being used in a first method step, for example. In this step, the upper limiting value of the safe range is limited by the formation and/or prevention of $O_2$ bubbles, and the lower limiting value is limited by the formation and/or prevention of $N_2$, $CO_2$ and/or $SO_2$ bubbles and/or alloy damage. It was also discovered that various glasses have different safe ranges. The determination of the particular safe ranges takes place in laboratory tests carried out in advance, for example. Surprisingly, it has also been shown that even the same glasses can have deviating safe ranges depending on the raw materials used and, in particular, on the water content of the melt. In addition, the water content of the atmosphere above and around the melt also has a strong influence on the oxygen partial pressure in the melt.

A further development of the method according to the present invention is characterized by the fact that a lower threshold value of the oxygen partial pressure of the safe range is above $10^{-7}$ bar, preferably $10^{-4}$ bar, and, in particular, above $10^{-3}$ bar. Depending on the particular glass that is used, it has been shown that, with certain glasses, disturbances do not occur until the pressure drops below $10^{-7}$ bar. With other glasses, a disturbance does not occur until the pressure falls below $10^{-4}$ bar. Above $10^{-3}$ bar formation of $N_2$, $CO_2$ and $SO_2$ bubbles and the occurrence of alloy damage are ruled out in nearly every case.

With another further development, an upper threshold value of the oxygen partial pressure of the safe range is 0.4 bar, When the pressure falls below 0.4 bar and pressure is being regulated in a safe range, disturbance caused by the formation of oxygen bubbles on precious metal components is reliably prevented in most cases. By way of this regulation in the safe range, it is not necessary to increase a reverse voltage for a period long enough to prevent bubbles from forming, for example. Rather, this regulation makes it possible to adjust to conditions in the safe range in advance, so that defect-free production is ensured.

The basis of the present invention is to measure the oxygen partial pressure, for which an electrode pair composed of a reference electrode and a measuring electrode is used as the probe. In particular, a zircon oxide reference electrode or a molybdenum reference electrode may be used as the reference electrode. A platinum measuring electrode can be used as the measuring electrode. It is also possible to use the precious metal walls themselves as the measuring electrode, however.

It has proven advantageous to use the oxygen partial pressure in the melt as the set point value for the regulation and, in fact, in its state when it leaves the melting area and, in particular, before the oxygen partial pressure has changed due to contact with a precious metal wall. The oxygen partial pressure of the setpoint value is measured at a precious metal electrode in particular, whereby actual values are the oxygen partial pressures at the precious metal walls. The same reference electrode can then be used, preferably, to determine the set point values and the actual value. The oxygen partial pressure in the unchanged melt is compared with the oxygen partial pressure at the interface with the precious metal walls in the manner described. Good results are obtained as a result. It can also be necessary, however, to select another set point value based on the known safe range.

With the procedure according to the present invention, the oxygen partial pressure is determined using the electromotive force, EMF, between the measuring electrode and the reference electrode of the electrode pair. The electromotive force, EMF, is linked with oxygen partial pressure in a known manner, via the Nernst equation, by way of which the oxygen partial pressure can be easily determined. A reference electrode for performing an electrochemical determination of the oxygen partial pressure is known from DE 43 24 922 A1, in particular. In general, when a "$ZrO_2$ reference electrode" composed of yttrium-stabilized zircon oxide is used, the oxygen partial pressure $pO_2$ (2) of the melt can be determined from the electromotive force, EMF, of the isothermal electrochemical measuring chain Pt, $O_2$ (1)/$ZrO_2$+x $Y_2O_3$/melt, $O_2$ (2)/Pt as follows:

$$pO_2(2) = pO_2(1) * e^{-E4F/(RT)}$$

wherein F is the Faraday constant,
R is the gas constant,
T is the temperature in the glass melt in ° K. With non-isothermal melts, the temperatures of measuring and reference electrodes must be measured separately. To calculate the oxygen partial pressure, an expanded formula is therefore necessary:

$$pO_{2(S)} = \exp((4*F/R*T_{(S)})*(E-(-0.0004739)*(T_{(S)}-T_{(R)})) + T_{(R)}/T_{(S)}*\ln pO_{2(R)},$$

wherein $T_{(S)}$ is the temperature of the melt measured at the site of the platinum measuring electrode,
$T_{(R)}$ is the temperature at the site of the $ZrO_2$ reference electrode,
$pO_{2(R)}$ is the oxygen partial pressure of the rinse gas at the reference electrode, and
−0.0004739 V/K is the Seebeck coefficient of the melt and/or zirconium oxide.

For more information, refer to Baucke, "Electrochemistry of Glasses and Glass Melts, Including Glass Electrodes", Springer Verlag, Berlin, Heidelberg, N.Y., 2000.

A prerequisite for the use of the equation described is that a defined oxygen partial pressure $pO_2$ (1) exists at the three-phase limit Pt (1), $O_2$ (1) $ZrO_2$+x $Y_2O_3$.

To influence the oxygen partial pressure, a counter electrode can be located upstream in the glass melt. For example, it can be located so far upstream that any gas bubbles, which form on the counter electrode, cause no damage to the glass that is produced. To influence the oxygen partial pressure, a reverse voltage can then be applied between the counter electrode and the precious metal wall. It is also possible to use a counter electrode composed of refractory metal, in particular molybdenum, however, and to connect it in a conductive manner with the precious metal wall. This molybdenum electrode can then discharge positively charged metal ions into the glass melt and thereby provide a suitable reverse voltage at the precious metal wall.

With another embodiment, to influence the oxygen partial pressure, mixtures of water vapor and air or water vapor and nitrogen with a specified portion of vapor or hydrogen gas at a specified partial pressure are directed at the side of the precious metal wall facing away from the glass melt. The former have the lowest reduction effect and the latter have the strongest reduction effect. Oxygen-nitrogen mixtures have an oxidizing effect and can prevent drifting into the reducing region with subsequent formation of $N_2$, $CO_2$, $SO_2$ bubbles. For this purpose, the precious metal wall can be provided with a double-wall configuration, for example, so that the hydrogen gas or water vapor need be applied only to a cavity located between the double walls.

The device according to the present invention includes at least one precious metal wall or refractory metal wall that at least partially encloses the molten glass, and is characterized by a regulating system for regulating the oxygen partial pressure, in particular in the region near the interface of the melt and the tank wall.

In particular, the device includes a first electrode pair for determining the oxygen partial pressure in the glass melt as a set point value and a second electrode pair for determining the oxygen partial pressure as an actual value for the regulation, whereby the precious metal wall is preferably the measuring electrode of the electrode pair. It is also possible, in principle, to locate the measuring electrode in a region close to the wall such that it is insulated from the wall. Preferably, all electrode pairs should have a common reference electrode; less outlay is required and the accuracy of the measurement is increased as a result.

The glass obtained with the method or the device having the features of the present invention is suited in particular for the production of LCDs, TFTs, monitors, television screens, optical lenses, cooking utensils, microwave utensils, electronic devices, cook tops, window glasses, lamp glasses and display glasses.

BRIEF DESCRIPTION OF THE DRAWINGS

FIG. 4 is a diagram showing safe ranges for $pO_2$ for different types of glass.

DESCRIPTION OF THE PREFERRED EMBODIMENTS

Figure 1:
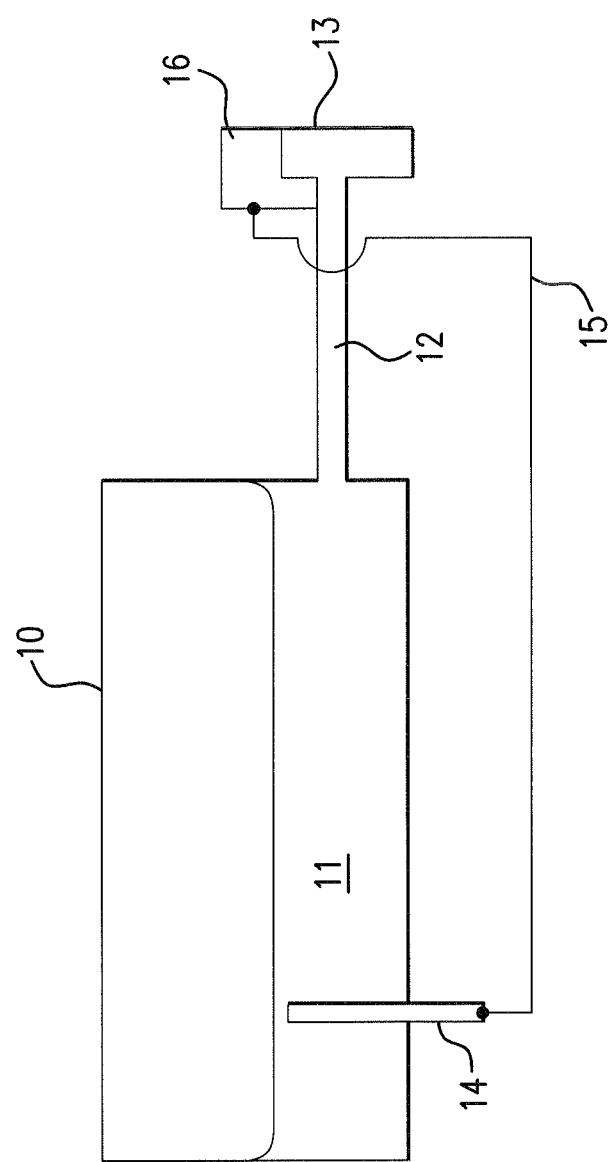
FIG. 1 is a schematic sectional representation of a device for making glass with the features according to the present invention.

FIG. 1 shows a device having the features of the present invention, as a first exemplary embodiment. The figure shows a melting area 10 with glass melt 11 located therein. Melting area 10 is shown as a schematic illustration only. In particular, various areas for melting and refining are not shown in the figure. Melting area 10 is connected with a stirring crucible 13 via a feeder channel 12. In the exemplary embodiment shown, feeder channel 12 and stirring crucible 13 are composed of platinum or a platinum alloy. In addition, a counter electrode 14 is located in the melting area 10 in the region of the glass melt 11, the counter electrode being connected with a control system 16 by a line 15. Counter electrode 14 can also be located at another point. It is important that counter electrode 14 be located upstream of stirring crucible 13 and, in particular, upstream of a refining area.

Figure 2:
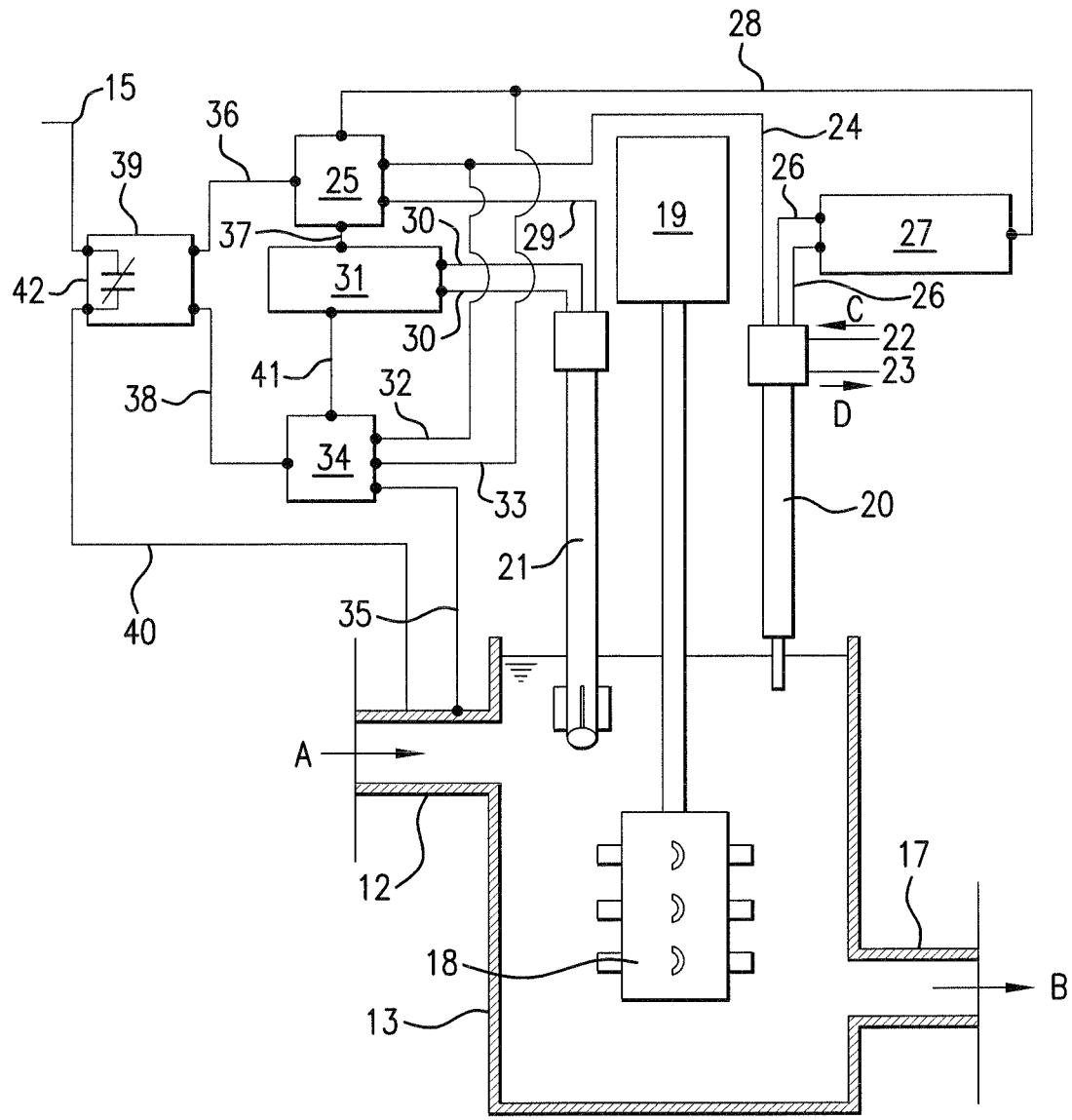
FIG. 2 is a schematic representation of a stirring crucible with a regulating system for adjusting the oxygen partial pressure using reverse voltage taken from the device shown in FIG. 1.

FIG. 2 shows a schematic illustration of stirring crucible 13 and control system 16 in FIG. 1. As shown in the figure, molten glass is forwarded to stirring crucible 13 from feeder channel 12, as indicated by arrow A. An outlet 17 is located on the side of stirring crucible 13 opposite feeder channel 12, through which said outlet glass is forwarded for further production, as indicated by arrow B. In addition, a stirring mechanism 18 with a drive 19 is located in stirring crucible 13. In the exemplary embodiment shown, stirring mechanism 18 is composed of platinum.

In addition, a reference electrode 20 and a measuring electrode 21 are located in the region of stirring crucible 13, the electrodes being immersed in the glass melt located in stirring crucible 13. In the exemplary embodiment shown, reference electrode 20 is a zircon oxide reference electrode. A molybdenum rod can also be used as the reference electrode, if it is ensured that the molybdenum rod does not alloy on the surface in the melt, and that it is not alloyed. Reference electrode 20 includes a supply line 22 and a discharge line 23. Supply line 22 and discharge line 23 serve to supply and carry away, respectively, gas with a defined oxygen partial pressure, as indicated by arrows C and D. Reference electrode 20 is connected via a line 24 with a first evaluation unit 25. Reference electrode 20 is also connected via two lines 26 with a temperature measuring device 27. In the exemplary embodiment shown, reference electrode 20 includes a thermoelement, the two ends of which are connected via lines 26 with temperature measuring device 27, which is a thermoelement measuring device 27 in this case. Thermo-element measuring device 27 is also connected via a line 28 with first evaluation unit 25.

Electrode 21 is also connected via a line 29 with first evaluation unit 25. In addition, electrode 21 also includes a thermoelement, which is connected via lines 30 with a temperature measuring device 31 similar to temperature measuring device 27. The temperature of measuring electrode 21 measured by temperature measuring device 31 is forwarded to measuring device 25 via line 37.

Lines 24 and 28 are connected via lines 32 and 33 with a second evaluation unit 34 similar to first evaluation unit 25. A third input to second evaluation unit 34 is connected via a line 35 with feeder channel 12 in the region of the transition of feeder channel 12 to stirring crucible 13. The outputs of first evaluation unit 25 and second evaluation unit 34 are connected via lines 36, 38 with the inputs of a regulating unit 39. The regulating unit 39 is also connected via a line 40 with feeder channel 12 in the region of the transition to stirring crucible 13. In addition, regulating unit 39 is connected via line 15 with counter electrode 14.

The electromotive force, EMF, between reference electrode 20 and electrode 21 is determined using first evaluation unit 25 and, based also on the temperatures determined by thermoelement measuring devices 27 and 31, is converted to an oxygen partial pressure. This oxygen partial pressure is forwarded via line 36 to regulating unit 39 as the set point value for the regulation. Second evaluation unit 34 determines the electromotive force between reference electrode 20 and the wall of stirring crucible 13 and/or feeder channel 12 in the region of stirring crucible 13 and converts it, based on the temperature determined by thermoelement measuring device 31, to an oxygen partial pressure, which is forwarded to the regulating unit 39 via line 38 as the actual value for the regulation. Regulating unit 39 compares the actual value of the oxygen partial pressure transferred from evaluation unit 34 with the set point value for the oxygen partial pressure transferred from evaluation unit 25 and regulates a reverse voltage between counter electrode 14 and feeder channel 12 in the region of the transition to stirring crucible 13. The oxygen partial pressure in the region of the wall of stirring crucible 13 and feeder channel 12 in the region of the wall of stirring crucible 13 can be adjusted to a desired range in the manner described by reliably preventing disturbances to the glass that exits at B.

Figure 3:
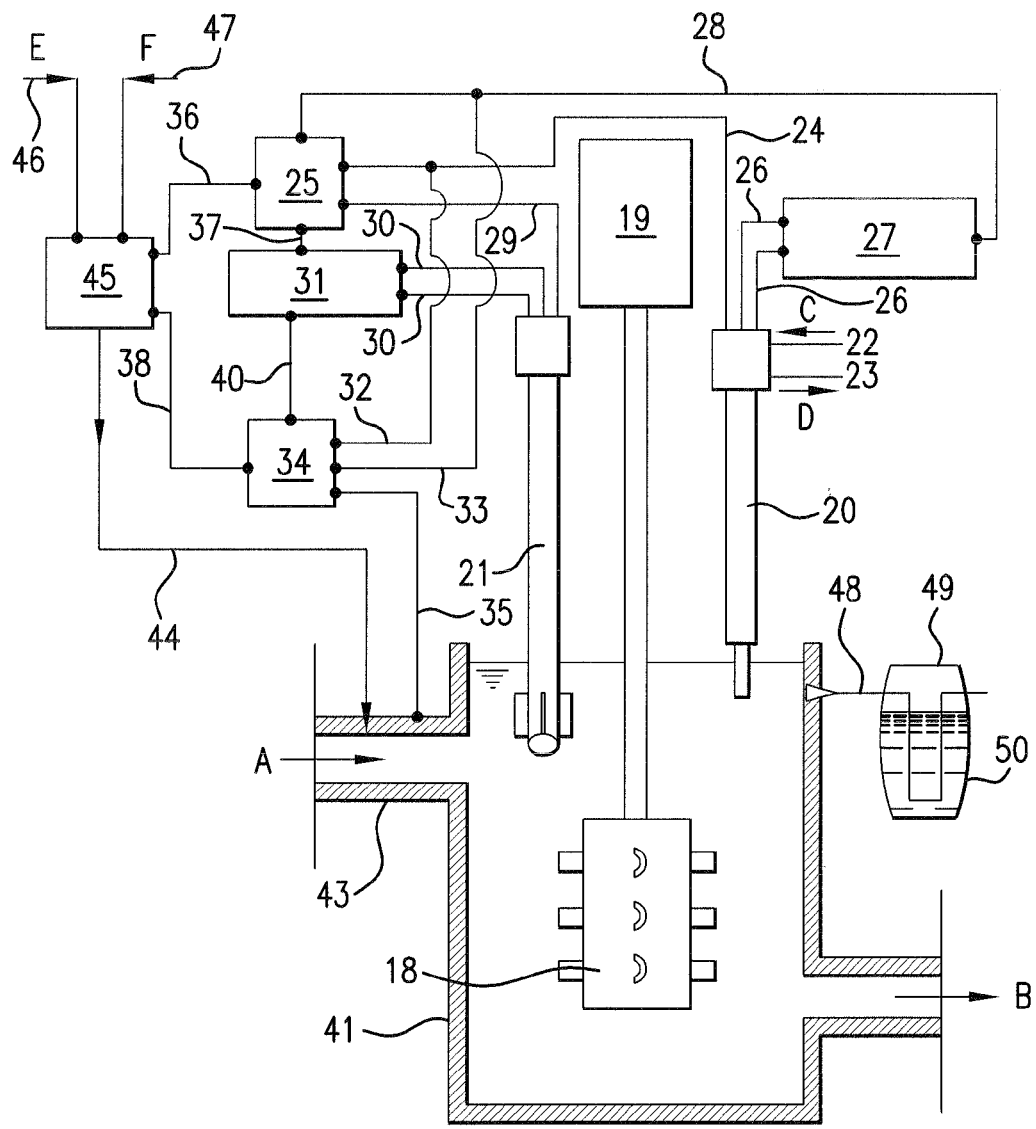
FIG. 3 is schematic representation of a stirring crucible with a regulating system for adjusting the oxygen partial pressure using vapor or gas rinsing taken from the device shown in FIG. 1.

FIG. 3 shows a schematic illustration of a further exemplary embodiment of a stirring crucible 41 and a control system having the features of the present invention. Identical elements are labeled with the same reference numerals. Stirring crucible 41 is connected with melting area via a feeder channel 43 similar to feeder channel 12. In contrast to stirring crucible 13 and feeder channel 12, stirring crucible 41 and feeder channel 43 have a double-wall configuration, so that gas can be directed through between the walls. An inlet in the region of feeder channel 43 is connected with a regulating unit 45 using a gas line 44. Similar to regulating unit 39, regulating unit 45 is connected with first evaluation unit 25 and second evaluation unit 34. Furthermore, regulating unit 45 includes an inlet for a gas line 46 and a further inlet for a gas line 47. Gas line 46 serves to supply a carrier gas such as nitrogen, as indicated by arrow E. Gas line 47 serves to supply a reactive gas, as indicated by arrow F. Water vapor and/or a hydrogen/nitrogen mixture can be used as the reactive gas.

An outlet of stirring crucible 41 is connected via a gas line 48 with a washing bottle 49, the outlet 50 of which leads to a waste gas purification system or an exhaust air line.

Similar to the exemplary embodiment in FIG. 2, regulating unit 45 performs regulation by comparing the actual value of the oxygen partial pressure at feeder channel 43 obtained from line 38 with the set point value of the oxygen partial pressure at electrode 21 obtained via line 36.

The mixing ratio of reactive gas F with carrier gas E is adjusted as a function of this setpoint/actual value comparison. The gas mixture obtained as a result is directed into the double wall of stirring crucible 41 and/or feeder channel 43. By adjusting a suitable hydrogen or water vapor partial pressure in the double wall of stirring crucible 41 and/or feeder channel 43, equilibrium is established between the diffusion of hydrogen from the glass melt through the wall of stirring crucible 41 and hydrogen from the double wall back through the wall and into the glass melt, so that a desired oxygen partial pressure at the interface of the metal and glass melt can be obtained. The gas then passes through gas line 48 and into washing bottle 49, and can then be carried away via outlet 50.

FIG. 4 shows a diagram that indicates safe ranges for various types of glass for various oxygen partial pressures in the glass melt. For example, a safe range for a glass AF 37 extends from $10^{-3}$ to 0.4 bar. Above 0.4 bar, $O_2$ bubbles start to form. Below $10^{-3}$ bar, $N_2$, $CO_2$ and $SO_2$ bubbles start to form. In an oxygen partial pressure range between $10^{-6}$ and $10^{-5}$, no $O_2$, $N_2$, $CO_2$ or $SO_2$ bubbles form. Alloy damage can occur at oxygen partial pressures below $10^{-6}$ bar.

For DURAN® 8330 glass (from Schott AG, Mainz, Germany), a safe range without disturbances from $10^{-7}$ to 0.4 bar was determined for oxygen partial pressures. At oxygen partial pressures above 0.4 bar, $O_2$ bubbles can be expected to form, as is the case with AF37 glass (Schott AG). When oxygen partial pressures are below $10^{-7}$ bar, there is a risk that alloy damage will occur.

The third glass shown in the diagram is FIOLAX® 8412 (Schott AG). A safe range for oxygen partial pressure from $10^{-4}$ to 0.4 bar was determined for this glass. In this case, $O_2$ bubbles can be expected to form at oxygen partial pressures above 0.4 bar. And, at oxygen partial pressures below $10^{-4}$ bar, there is a risk of alloy damage.

According to the present invention, damage and disturbance to the glass that is produced are prevented by determining a safe range, depending on the type of glass used, and regulating to oxygen partial pressures in the particular safe range using control systems 16, 42 and, in particular, regulating units 39, 45.

We claim:

1. A device for manufacturing glass in which bubble formation on precious metal or refractory metal components is prevented, said device comprising:
   a precious metal or refractory metal wall at least partially surrounding a glass melt from which the glass is manufactured;
   means for measuring an oxygen partial pressure at an interface between said glass melt and said at least one precious metal or refractory metal wall, wherein said means for measuring said oxygen partial pressure at said interface comprises an electrode pair and a first evaluation unit, said electrode pair consists of a measuring electrode at the interface and a reference electrode in the glass melt, said first evaluation unit is connected electrically to said measuring electrode at said interface and to said reference electrode in said glass melt, and said first evaluation unit determines a first potential difference between said measuring electrode at said interface and said reference electrode in said glass melt and converts said first potential difference into said oxygen partial pressure at said interface;
   means for measuring an oxygen partial pressure in the glass melt, said means for measuring said oxygen partial pressure in said glass melt comprises another electrode pair and a second evaluation unit, said another electrode pair consists of a measuring electrode in the glass melt and said reference electrode in the glass melt, said second evaluation unit is connected electrically to said measuring electrode in the glass melt and to said reference electrode in the glass melt, and said second evaluation unit determines a second potential difference between said measuring electrode in said glass melt and said reference electrode in said glass melt and converts said second potential difference into said oxygen partial pressure in said glass melt; and
   a regulating unit connected electrically to said first evaluation unit so as to receive said oxygen partial pressure at said interface from said first evaluation unit and also connected electrically to said second evaluation unit so as to receive said oxygen partial pressure in said glass melt from said second evaluation unit;
   wherein said regulating unit performs a comparison between said oxygen partial pressure at said interface and said oxygen partial pressure in said glass melt supplied to the regulating unit by said first evaluating device and said second evaluating device and adjusts a mixing ratio of a reactive gas and a carrier gas in a gas mixture supplied to a side of said precious metal or refractory metal wall facing away from the glass melt according to said comparison between said oxygen partial pressure at said interface and said oxygen partial pressure in said glass melt, so that said oxygen partial pressure at said interface is maintained within a safe range, said safe range having an upper threshold value, above which oxygen bubbles form in said glass melt at said interface, and a lower threshold value, below which alloy damage occurs to said precious metal or refractory metal wall at said interface or formation of bubbles of $N_2$, $CO_2$ or $SO_2$ occurs in said glass melt at said interface.

2. The device according to claim 1, further comprising a first temperature measuring device connected with said reference electrode and configured to measure a temperature of said reference electrode and a second temperature measuring device connected with said measuring electrode in said glass melt and configured to measure a temperature of said measuring electrode in said glass melt, and wherein said first temperature measuring device is connected to said first evaluation unit and also to said second evaluation unit to supply said temperature of said reference electrode thereto, and said second temperature measuring device is connected to said first evaluation unit and said second evaluation unit to supply said temperature of said measuring electrode in said glass melt thereto;
   so that said first evaluation unit determines said oxygen partial pressure at said interface from said first potential difference, said temperature of said reference electrode, and said temperature of said measuring electrode in said glass melt; and said second evaluation unit determines said oxygen partial pressure in said glass melt from said second potential difference, said temperature of said reference electrode, and said temperature of said measuring electrode in said glass melt.

3. The device according to claim 1, further comprising a melting area in which said glass melt is formed, and wherein said measuring electrode of said means for measuring said oxygen partial pressure in said glass melt is arranged at a location in said glass melt where said glass melt leaves the melting area and where said oxygen partial pressure has not changed from that in said melting area due to contact with said precious metal or refractory metal wall.

4. The device according to claim 3, wherein said measuring electrode at said interface consists of said precious metal or refractory metal wall.

5. The device according to claim 1, further comprising a melting area in which said glass melt is formed, a stirring crucible in which said glass melt is stirred and a feeder channel connecting said melting area with said stirring crucible in order to supply said glass melt formed in the melting area to said stirring vessel, and wherein said feeder channel comprises said precious metal or refractory metal wall and said precious metal or refractory metal wall of said feeder channel has a double-wall configuration with an inlet connected to the gas mixture line.

6. The device according to claim 5, wherein said measuring electrode at said interface consists of said precious metal or refractory metal wall.

7. The device according to claim 5, further comprising a carrier gas line connected to an inlet of said regulating unit in order to supply said carrier gas to said regulating unit; a reactive gas line connected to another inlet of said regulating unit in order to supply said reactive gas to said regulating unit; and a gas mixture line connecting said regulating unit to said side of said precious metal or refractory metal wall facing away from the glass melt in order to supply said gas mixture of said carrier gas and said reactive gas to said of side of said precious metal or refractory metal wall facing away from the glass melt.

8. A device for manufacturing glass in which bubble formation on precious metal or refractory metal components is prevented, said device comprising:

a melting area in which said glass melt is formed;

a precious metal or refractory metal wall at least partially surrounding a glass melt from which the glass is manufactured, said precious metal or refractory metal wall being arranged outside of said melting area;

means for measuring an oxygen partial pressure at an interface between said glass melt and said at least one precious metal or refractory metal wall, wherein said means for measuring said oxygen partial pressure at said interface comprises an electrode pair and a first evaluation unit, said electrode pair consists of a measuring electrode at the interface and a reference electrode in the glass melt, said first evaluation unit is connected electrically to said measuring electrode at said interface and to said reference electrode in said glass melt, and said first evaluation unit determines a first potential difference between said measuring electrode at said interface and said reference electrode in said glass melt and converts said first potential difference into said oxygen partial pressure at said interface;

means for measuring an oxygen partial pressure in the glass melt, said means for measuring said oxygen partial pressure in said glass melt comprises another electrode pair and a second evaluation unit, said another electrode pair consists of a measuring electrode in the glass melt and said reference electrode in the glass melt, said second evaluation unit is connected electrically to said measuring electrode in the glass melt and to said reference electrode in the glass melt, and said second evaluation unit determines a second potential difference between said measuring electrode in said glass melt and said reference electrode in said glass melt and converts said second potential difference into said oxygen partial pressure in said glass melt, and wherein said measuring electrode of said means for measuring said oxygen partial pressure in said glass melt is arranged at a location in said glass melt where said glass melt leaves the melting area and where said oxygen partial pressure has not changed from that in said melting area due to contact with said precious metal or refractory metal wall; and a regulating unit connected electrically to said first evaluation unit so as to receive said oxygen partial pressure at said interface from said first evaluation unit and also connected electrically to said second evaluation unit so as to receive said oxygen partial pressure in said glass melt from said second evaluation unit;

wherein said regulating unit performs a comparison between said oxygen partial pressure at said interface and said oxygen partial pressure in said glass melt supplied to the regulating unit by said first evaluating device and said second evaluating device and adjusts a mixing ratio of a reactive gas and a carrier gas in a gas mixture supplied to a side of said precious metal or refractory metal wall facing away from the glass melt according to said comparison between said oxygen partial pressure at said interface and said oxygen partial pressure in said glass melt, so that said oxygen partial pressure at said interface is maintained within a safe range, said safe range having an upper threshold value, above which oxygen bubbles form in said glass melt at said interface, and a lower threshold value, below which alloy damage occurs to said precious metal or refractory metal wall at said interface or formation of bubbles of $N_2$, $CO_2$ or $SO_2$ occurs in said glass melt at said interface.

9. The device according to claim 8, wherein said measuring electrode at said interface consists of said precious metal or refractory metal wall.

10. The device according to claim 8, further comprising a carrier gas line connected to an inlet of said regulating unit in order to supply said carrier gas to said regulating unit; a reactive gas line connected to another inlet of said regulating unit in order to supply said reactive gas to said regulating unit; and a gas mixture line connecting said regulating unit to said side of said precious metal or refractory metal wall facing away from the glass melt in order to supply a gas mixture of said carrier gas and said reactive gas to said of side of said precious metal or refractory metal wall facing away from the glass melt.

* * * * *